US005801689A

United States Patent [19]
Huntsman

[11] Patent Number: 5,801,689
[45] Date of Patent: Sep. 1, 1998

[54] HYPERTEXT BASED REMOTE GRAPHIC USER INTERFACE CONTROL SYSTEM

[75] Inventor: Robert A. Huntsman, Boise, Id.

[73] Assignee: Extended Systems, Inc., Boise, Id.

[21] Appl. No.: 599,458

[22] Filed: Jan. 22, 1996

[51] Int. Cl.$^6$ .................................................. G06F 3/00
[52] U.S. Cl. ................................. 345/329; 395/200.38
[58] Field of Search ................... 395/335, 200.01, 395/200.02, 200.9, 200.17, 200.18, 200.3, 200.33, 200.34, 200.38, 200.47, 200.5, 200.6; 345/329, 330, 331, 332, 333, 334, 335, 339, 971

[56] References Cited

U.S. PATENT DOCUMENTS

| 5,335,320 | 8/1994 | Iwata et al. | 395/704 |
| 5,432,932 | 7/1995 | Chen et al. | 395/673 |
| 5,544,320 | 8/1996 | Konrad | 395/200.33 |

FOREIGN PATENT DOCUMENTS 9182038  7/1997  Japan.

OTHER PUBLICATIONS

De Rouchey, W.J., "A Remote Visual Interface Tool for Simulation Control and Display," Nat. Aerospace & Electronics Conf. 1991, pp. 954–959.

Roger T. Stevens, The "C" Graphics Handbook (Academic Press, 1992) pp. 731–768.

Steve Rimmer, Bit–Mapped Graphics (Windcrest, 1990) Chapters. 5 and 6, pp. 127–193.

Microsoft Developer Network Development Library, "DIP API" and Microsoft Windows Hooks (Microsoft, Apr. 1995).

Schildt et al., Osborne Windows Programming Series, vol. 2, Chapters 2, 33 and 34.

Ian S. Graham, HTML Sourcebook (John Wiley & Sons, 1995) Chapters 4 and 5, pp. 181–247.

Laura Lemay, Teach Yourself Web Publishing with HTML in a Week (SAMS Publishing, 1995) pp. 325–343.

Net.Genesis and Devra Hall, Build a Web Site (Prime Publishing, 1995) Chapter 6, Appendix B and Section 4.1.7, pp. 122–123.

Douglas E. Comer, Internetworking with TCP/IP, vol. 1 (Prentiss–Hall, 1991) Chapter 23, pp. 407–418.

*Primary Examiner*—A. Katbab
*Attorney, Agent, or Firm*—Steven R. Ormiston

[57] ABSTRACT

A remote control system for remotely controlling a Microsoft Windows or other GUI-based first computer from a second computer over the internet using only a standard world-wide-web hypertext browser on the second computer. The second controlling computer may be dissimilar from the first controlled computer user interface, underlying operating system, and hardware architecture.

18 Claims, 10 Drawing Sheets

```
<HTML>
<HEAD>
<TITLE>Extended Systems Winternet Remote Control</TITLE>
</HEAD>
<BODY>
<P><a href="remo####.htm">refresh</a></P>
<P><a href="remx####.htm">mode</a></P>
<a href="http:clik####.xxx">
<IMG SRC="SCRN####.GIF" ISMAP>
</A>
</BODY>
</HTML>
```

REMOTE2.HTM

FIG. 9

```
<HTML>
<HEAD>
<TITLE>FORM TEST</TITLE>
</HEAD>
<BODY>
<P><a href="remo####.htm">Refresh</a></P>
<P><a href="last####.htm">Last page</a></P>
<FORM METHOD="GET" ACTION="mode####htm">
<INPUT TYPE="radio" CHECKED NAME="mode" VALUE="1">single
click
<INPUT TYPE="radio" NAME="mode" VALUE="2">double click
<INPUT TYPE="radio" NAME="mode" VALUE="3">keyboard text
<INPUT TYPE="radio" NAME="mode" VALUE="4">drag (start)
<BR><BR>
<INPUT TYPE="text" NAME="keytext">* type keyboard test here
<BR><BR>
<BR><BR>

<INPUT TYPE="submit" VALUE="Submit new mode">
</FORM>
</BODY>
</HTML>
```

45

REMOTE.HTM

*FIG. 10*

HYPERTEXT BASED REMOTE GRAPHIC USER INTERFACE CONTROL SYSTEM

This ion relates generally to the field of remotely controlling a first computer from a second computer, where the first computer has a graphical user interface (GUI) and the second computer may have a-dissimilar user interface and a dissimilar operating environment from the first computer.

BACKGROUND OF THE INVENTION

With the widespread adoption of the internet, a world-wide computer information network, computers from locations around the world are logically connected. Many other distinct networks exist in private companies, educational institutions, and government agencies. A useful feature of the internet is a well known service called TELNET. TELNET allows a first computer to be controlled by a second computer from virtually anywhere on their shared network. In the case of the internet, the controlling computer is often thousands of miles from the controlled computer. This allows users access to remote computers around the world.

TELNET is based on a textual user interface, typically based on the UNIX operating system. Text based user interfaces easily translate across computer environments because text, for the most part, looks the same on different operating platforms.

With the introduction of the Apple Macintosh, XWindows, and Microsoft Windows, graphical user interfaces (GUIs) have become popular. GUIs are computer user interfaces that are pictorial rather than text based. GUI environments tend to use a pointing device, like a mouse, in addition to a keyboard. Instead of typing a textual command, the user of a graphical interface typically selects a button or menu selection with a pointing device such as a mouse and "clicks" on his selection. Although GUIs are popular with a large class of computer users, GUI based programs cannot be remotely controlled with text-based TELNET.

GUI is a term of art. It is an acronym for "graphical user interface" and is used to picture and graphic based computer systems contrasted with text based computing environment. Examples of GUI's is Microsoft Windows, the Apple Macintosh, and XWindows. Examples of non GUI, text based computing environments is MS-DOS, and UNIX.

Hypertext is also a term of art. Hypertext describes a naming convention in a networking computer environment where an information source, such as an encyclopedia article, displayed in a textual format, can contain hypertext links that reference other articles or even other reference sources that in general are stored in a remote location. In modern computer systems, when a hypertext link is selected, the computer system can retrieve the information associated with the hypertext links automatically. A modern, well-known hypertext language is the hypertext markup language used by the world-wide-web of the internet, better known by its acronym HTML [6,7].

To address the problem of controlling GUI based programs, specialized remote control programs have been created. The current GUI remote control programs generally require that the controlling machine and the controlled machine have similar screen characteristics and run identical operating environments. For example some products require both the controlling machine and the controlled machine to run similar versions of Microsoft Windows and additionally require that special remote control software to be loaded on both the controlling machine and the controlled machine. Such products cannot be used in situation where the user is not permitted to load software on a candidate remote computer.

A common component of remote control programs for GUI-based machines is a software routine that reads the GUI screen image a suitable screen data structure by some means for further processing. Such routines are widely available for most GUIS and programming environments.

Hypertext markup languages, such as HTML have been defined to store documents with visual highlights such as large type, bold type, underlining, and so forth, in a machine independent format. HTML is a well known hypertext markup language used extensively in the World-Wide-Web (WWW) service of the internet. Hypertext browser programs are written for a large number of different operating environments, thus allowing the same hypertext document to be read on very different computing environments such as an Apple MAC, an IBM Personal Computer using Microsoft Windows, or a Unix machine running XWindows. Each machine presents the document in its local environment in the best way it can. A hallmark feature of hypertext languages is a hypertext link. A hypertext link is typically a highlighted textual indicator, that, when selected by a user reading the containing hypertext document on a computer, causes a new hypertext document referenced by the link to be automatically loaded. Thus a user of a hypertext browser can access data encoded by its author in an appropriate hypertext markup language (HTML) in a very convenient and powerful way. When the text of a current document makes reference to a related topic, the user simply clicks on the hypertext link associated with the related document, and the system automatically retrieves the related document from a location generally unknown to the user, and displays it on the screen.

One of the first popular hypertext browser was for the world-wide-web(WWW) of the internet is MOSAIC. There are currently a large number of other hypertext browsers, including Cello, Lynx, Hotjava, Netscape, Spyglass Enhanced Mosaic, Mac Mosaic, Air Mosaic, Omniweb, O'Reilly Mosaic, MACS-W3. Internet MCI, Ventani Mosaic, CERN Line Mode, Pipe Web, Midas WWW, Charlotte, Digital Mosaic, NEC MosaicView, AT&T Enhanced Mosaic, NOV*IX Mosaic, Internet Commander, Quarterdeck Mosaic, WebExplorer, MacWeb, and IWENG (America On-Line). The World Wide Web (WWW) service of the internet forms a world-wide conglomeration of hypertext documents and is the fastest growing segment of the fast growing internet. Thus a large number of existing computers have a hypertext browser program already loaded on them. Hypertext browser programs and the related HTML language allow machine independent graphical presentation of data.

Using current technology, it is not possible to control GUI based machines in a general way from remote computers, either similar or dissimilar, using existing internet services. What is needed is the ability to control GUI programs remotely from a dissimilar computer, using readily available internet services and programs.

An object of this invention is to provide a means for a program based on a graphical user interface (GUI) on a first computer to be remotely controlled from a second controlling computer where the two computers may be connected directly or indirectly by means of a local area network or a wide area network such as the internet. A further object of this invention is to allow the second computer to be dissimilar from the first computer both in its user interface and its underlying operating environment. A further object of this invention is to utilize readily available, and widely used software on candidate second computers, so that the remote control functionality can be introduced solely by installing remote control software on the first computer without any installation of remote control hardware or software resources on any potential controlling computers.

An extensive body of non-patent art teaches a number of topics that are helpful, but not essential, for practicing the preferred embodiment of the present invention. This non-patent art is publicly available as copyrighted books or CD-ROMS, commercially available at bookstores and other retailers. Since these works are generally covered by copyrights of others, direct incorporation of these works here is not appropriate. In order to assist those desiring to practice the invention to better understand the existing background technology needed to practice the present invention, the following non-patent prior art copyrighted sources are hereby incorporated by reference:

1. *The C Graphics Handbook*, by Roger T. Stevens (Academic Press, 1992), pages 731–768, teaches how to convert bitmap data into the GIF file format.
2. *Graphics Programming Solutions*, by Julio Sanchez and Maria P. Canton (McGraw Hill, 1995), Chapter 10.1, teaches about the GIF file format and how to read and write GIF files.
3. "Microsoft Developers Network Development Library", (Microsoft, April, 1995), Device-Independent Bitmap (DIB) API, function CopyScreenToDIB(), teaches how to read a Microsoft Windows GUI screen into a DIB data structure; also teaches how to write a bitmap data structure into a data file. A technical article by Kyle Marsh, "Microsoft Windows Hooks", teaches how to programmatically control a Microsoft Windows program, including how to programmatically operate the keyboard and mouse using the WH_JOURNALPLAYBACK message and functions SetWindowsHooksEx() and UnhookWindowsHookEx().
4. "Microsoft Windows Software Developer's Kit (SDK)", including Visual C++ 1.52 Help resource (Microsoft, 1995).
5. *OSBORNE WINDOWS PROGRAMMING SERIES*, Volume 2, General Purpose API Functions", by Herbert Schildt, Chris H. Pappas, and William H. Murray, III (Osborne Mc Graw-Hill, 1994), generally teaches the Microsoft Windows programming interface, and specifically teaches in chapter 2,33, and 34 how to read Microsoft Windows GUI screen into a DIB data structure.
6. *HTML Sourcebook*, by Ian S. Graham, (John Wiley & Sons, Inc, 1995), teaches HTML and HTTP protocol, including the use of GIF files to transport WWW images to a number of well known client computing environments.
7. *Web Publishing with HTML IN A WEEK*, by Laura Lemay, (SAMS Publishing, 1995), Chapters 1,4,5,6,7, and 13, teaches HTML protocol, the use of GIF image files, and "clickable" images.
8. *Using Netscape*, by Warren Ernst (Que, 1995) teaches about Netscape, a well known hypertext browser for the world-wide-web (WWW) of the internet.
9. *Building a Web Site*, by net.genesis [sic] and Perra Hally (Prime Publishing, 1995), Appendix B contains the complete specification for Hypertext Transfer Protocol— HTTP/1.0; and chapter 6 teaches generally about how to use HTTP in a computing environment.

SUMMARY OF THE INVENTION

This invention contemplates a new remote control system provides for a GUI program on a first "controlled" computer to be controlled from a second, potentially remote "controlling"computer, where the second controlling computer can be dissimilar from the first controlled computer both in its user interface and in its underlying operating environment. This new invention is realized combining GUI programs, remote control technology, and hypertext language in a new way. The new remote control system utilizes existing hypertext browser programs on a second computer and consequently requires no new software on the second computer. Instead, readily available existing hypertext browser programs already on many computers on the internet and other networks, when using the present invention, can control a GUI based program on a first computer. In the preferred embodiment, this invention allows a Microsoft Windows computer, including Windows NT and Windows 95, on a first computer to be controlled by a hypertext browser program such as NETSCAPE or MOSAIC on a second computer, where the second computer can be of any type supporting World Wide Web browser for the internet including a Unix machine, an Apple Macintosh, Microsoft Windows including Windows 95 and Windows NT or a non-graphical browser such as LYNX. The graphical screen of the first computer is reflected on the browser on the second computer, and controls, including buttons, when selected on the second computer, are executed on the first computer.

BRIEF DESCRIPTION OF THE DRAWINGS

FIG. 9 is a listing of the HTML source file REMOTE2.HTM used in the preferred embodiment of the present invention.

FIG. 10 is a listing of the HTML source file REMOTE.HTM used in the preferred embodiment of the present invention.

DETAILED DESCRIPTION OF THE INVENTION

Figure 1:
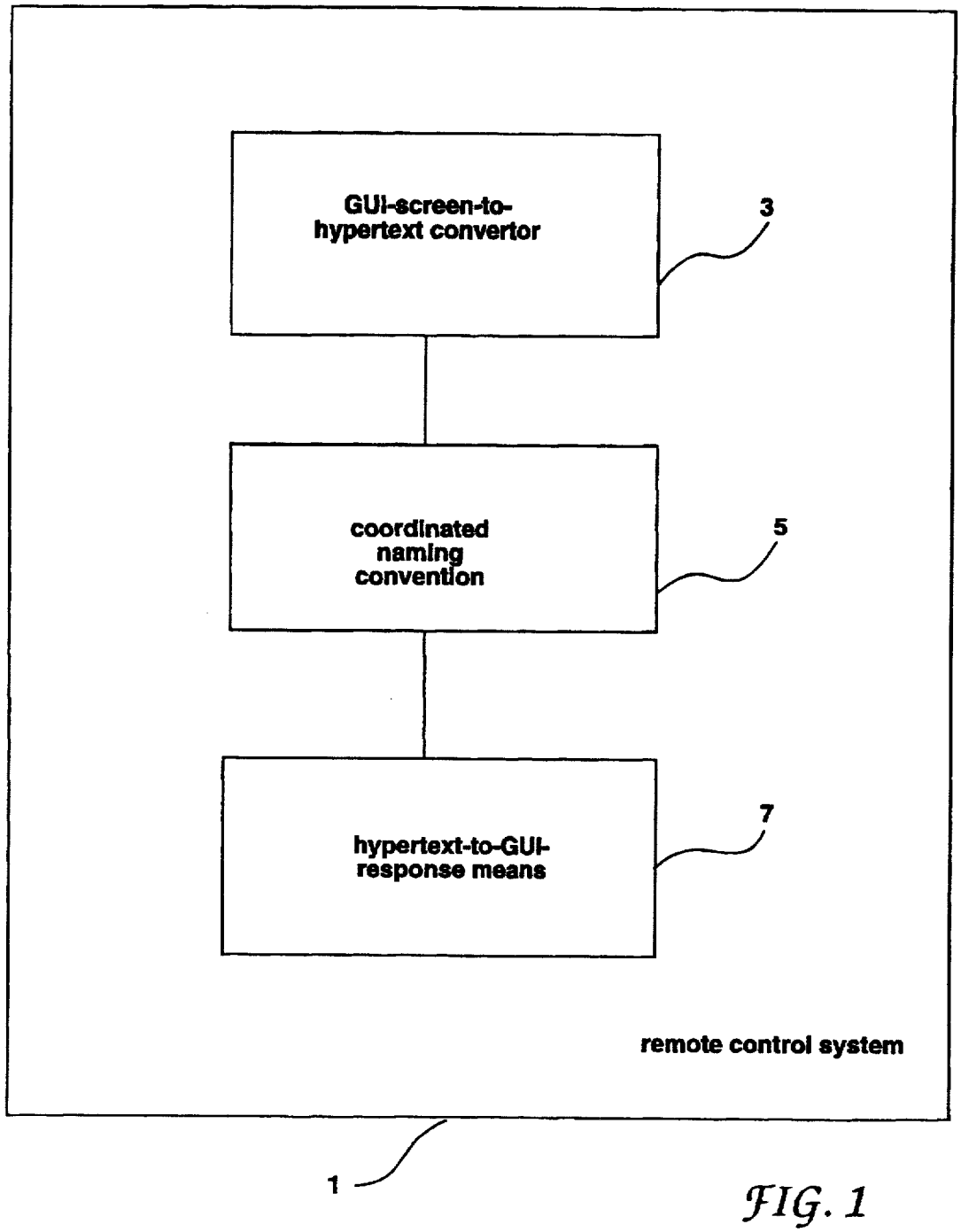
FIG. 1 is a block diagram of the major elements of a remote control system constructed in accordance with the principles of the present invention.
Figure 2:
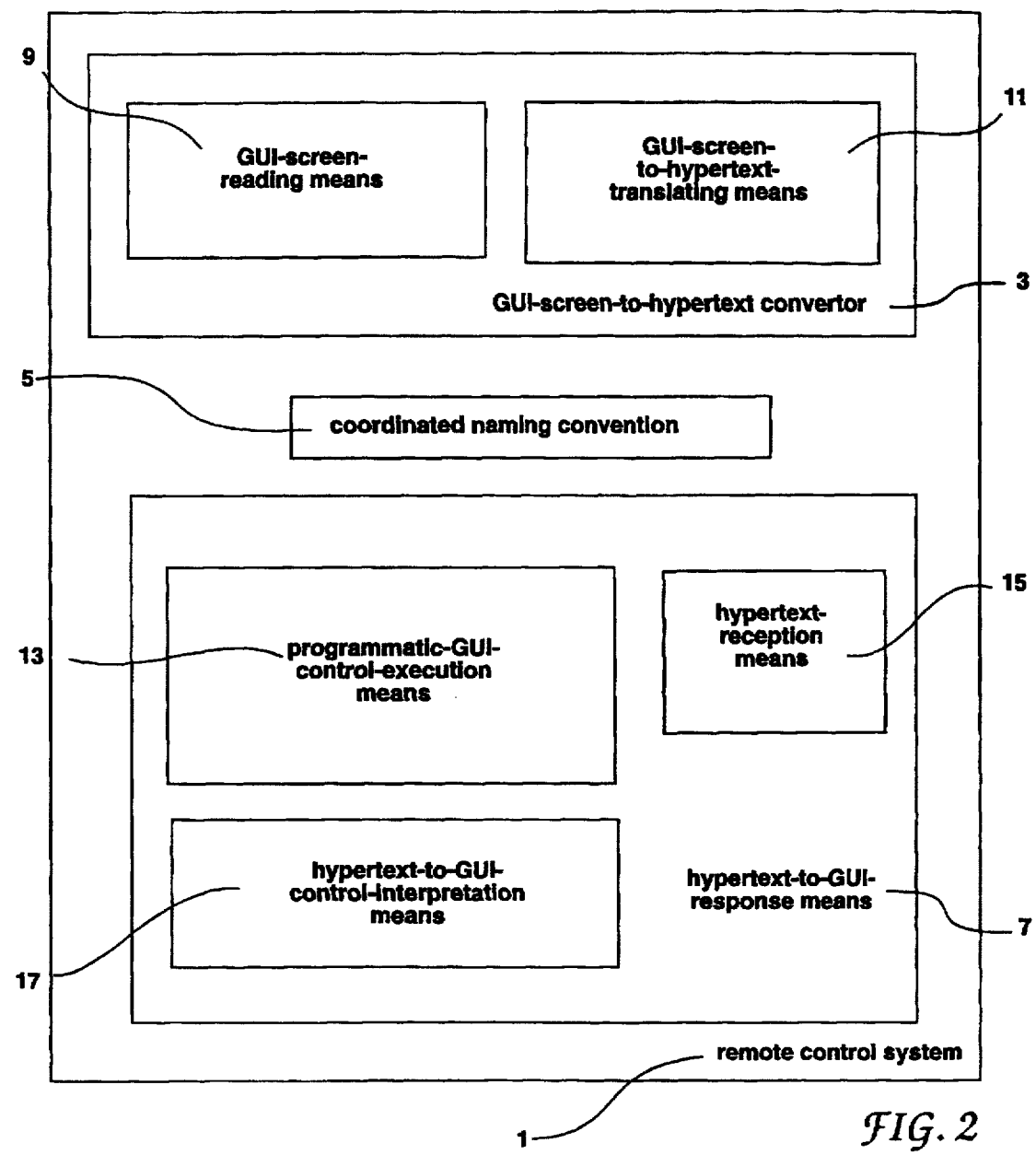
FIG. 2 is a block diagram showing the logical arrangement of the major elements of a remote control system constructed in accordance with the principles of the present invention.

FIG. 1 and FIG. 2 generally shows a remote control system 1 which is constructed in accordance with the principles of the present invention. The remote control system 1 has two main components. The first main component is a GUI-screen-to-hypertext convertor 3. The GUI-screen-to-hypertext convertor 3 is shown generally in FIGS. 1–4 and specifically in FIG. 5 and FIG. 6. The second main component is a hypertext-to-GUI-response means 7. The hypertext-to-GUI-response means 7 is also shown generally in FIGS. 1–4 and specifically in FIG. 7 and FIG. 8. These two components are combined using software means with a coordinated naming convention 5 to form a remote control system 1. The major components of the present invention are built from six "building block" components, grouped as shown in FIG. 2. The first two "building block" components are the GUI-screen-reading means 9 and GUI-screen-to-hypertext-translating means 11 that combine to form the GUI-screen-to-hypertext convertor 3 as shown in FIG. 2. The next three "building block" components are the programmatic-GUI-control-execution means 13, the hypertext-reception means 15, and the hypertext-to-GUI-control-interpretation means 17 that combine to form the hypertext-to-GUI-response means 7 as shown in FIG. 2. The final "building block" component is a coordinated naming convention 5 that is combined with the GUI-screen-to-hypertext convertor 3 and the hypertext-to-GUI-response means 7 to form the primary invention, the remote control system 1 as shown in FIGS. 1 and 2.

Figure 3:
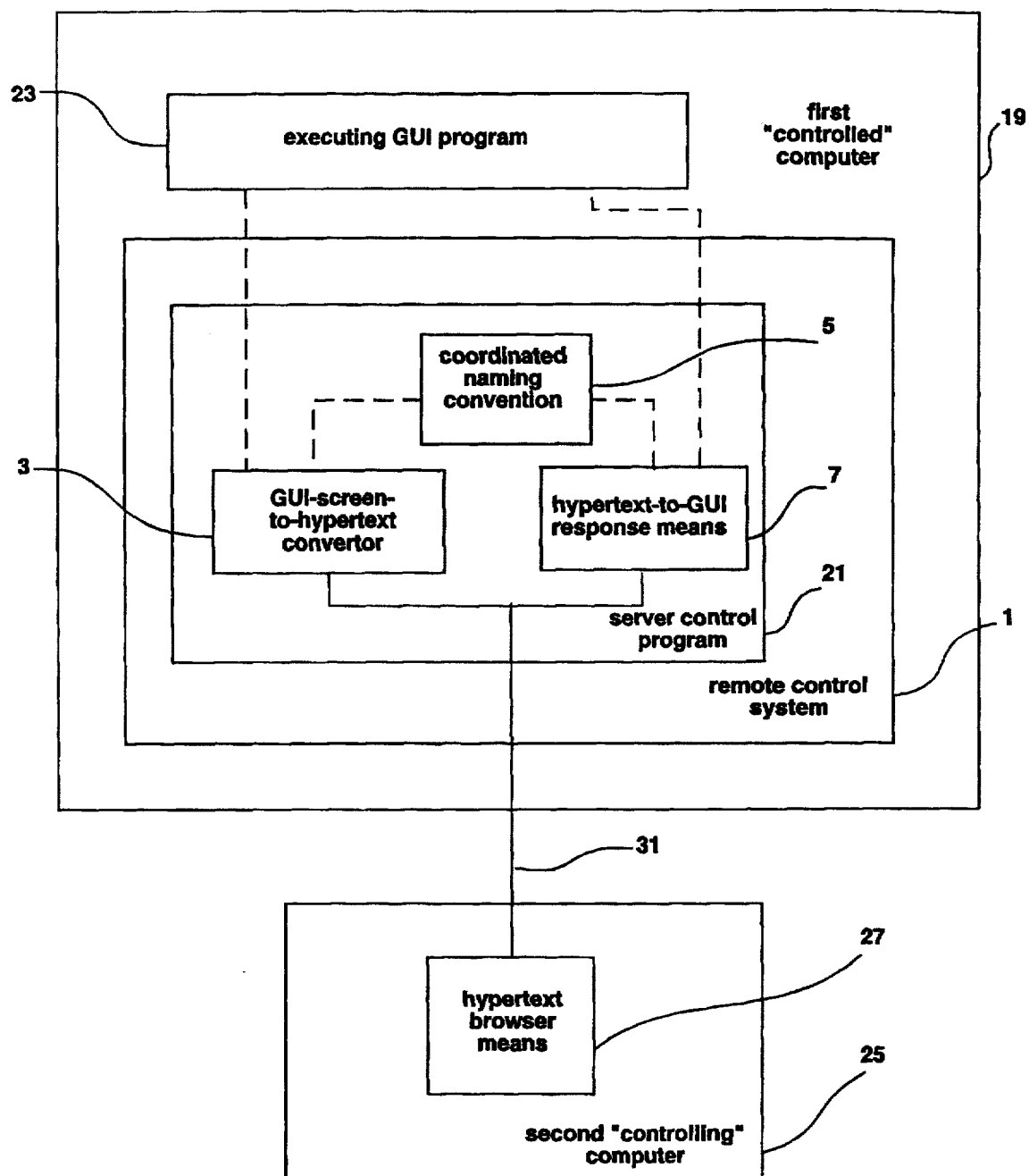
FIG. 3 is a block diagram of the present invention showing how the present invention interacts with a first and second computer effecting remote control in accordance with the principles of the present invention.
Figure 4:
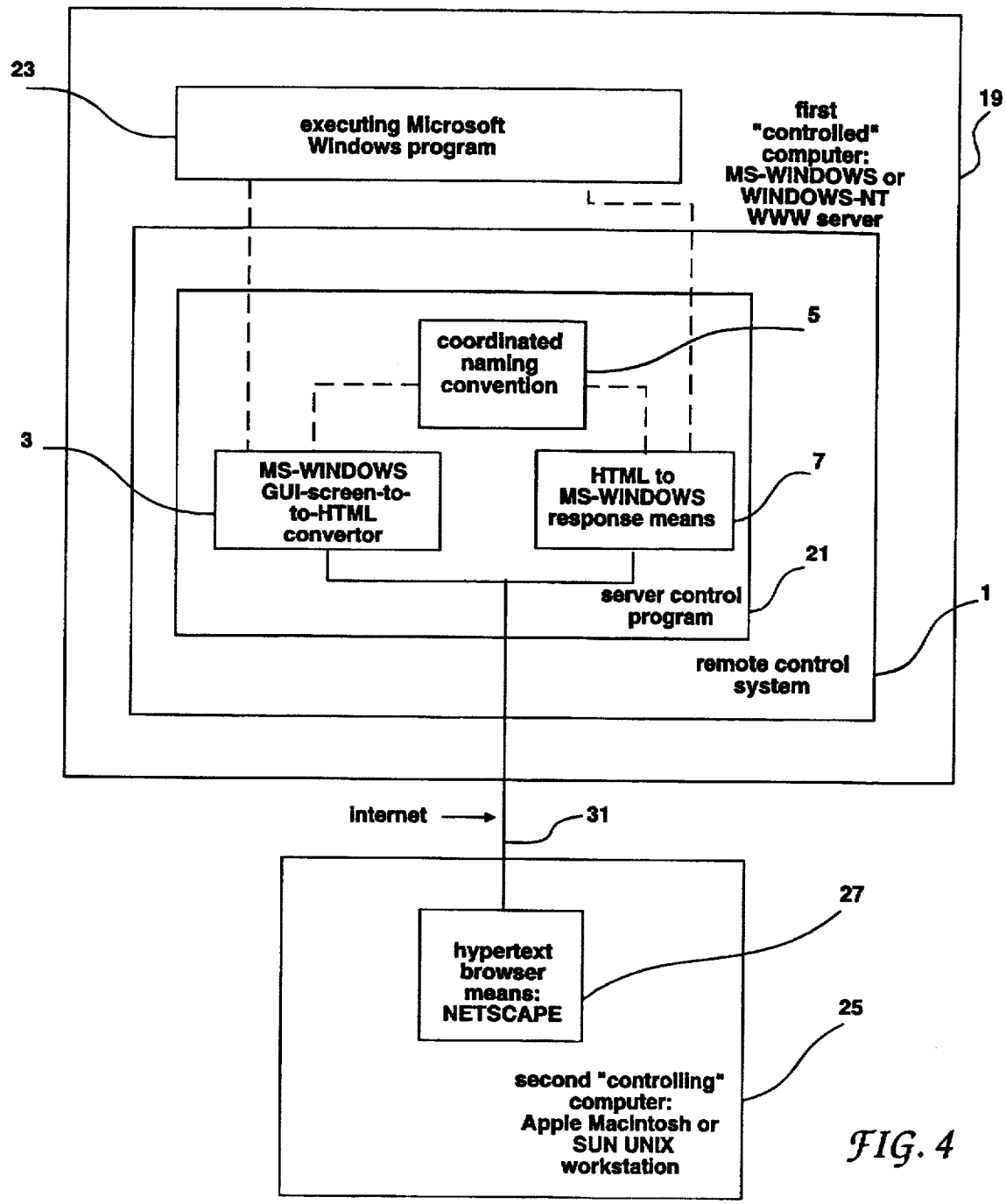
FIG. 4 is a variation of FIG. 3 illustrating the preferred embodiment of the present invention.

FIG. 3 shows a block diagram of the remote control system 1 as used in a generic computing environment. FIG. 4 shows a block diagram of the remote control system 1 as used in a specific computing environment, as contemplated in the preferred environment, namely, a Microsoft Windows-based server 19, used in conjunction with Netscape 19, an internet browser, on a second computer 25, such as an Apple Macintosh or any one of a number of Unix computers.

Figure 5:
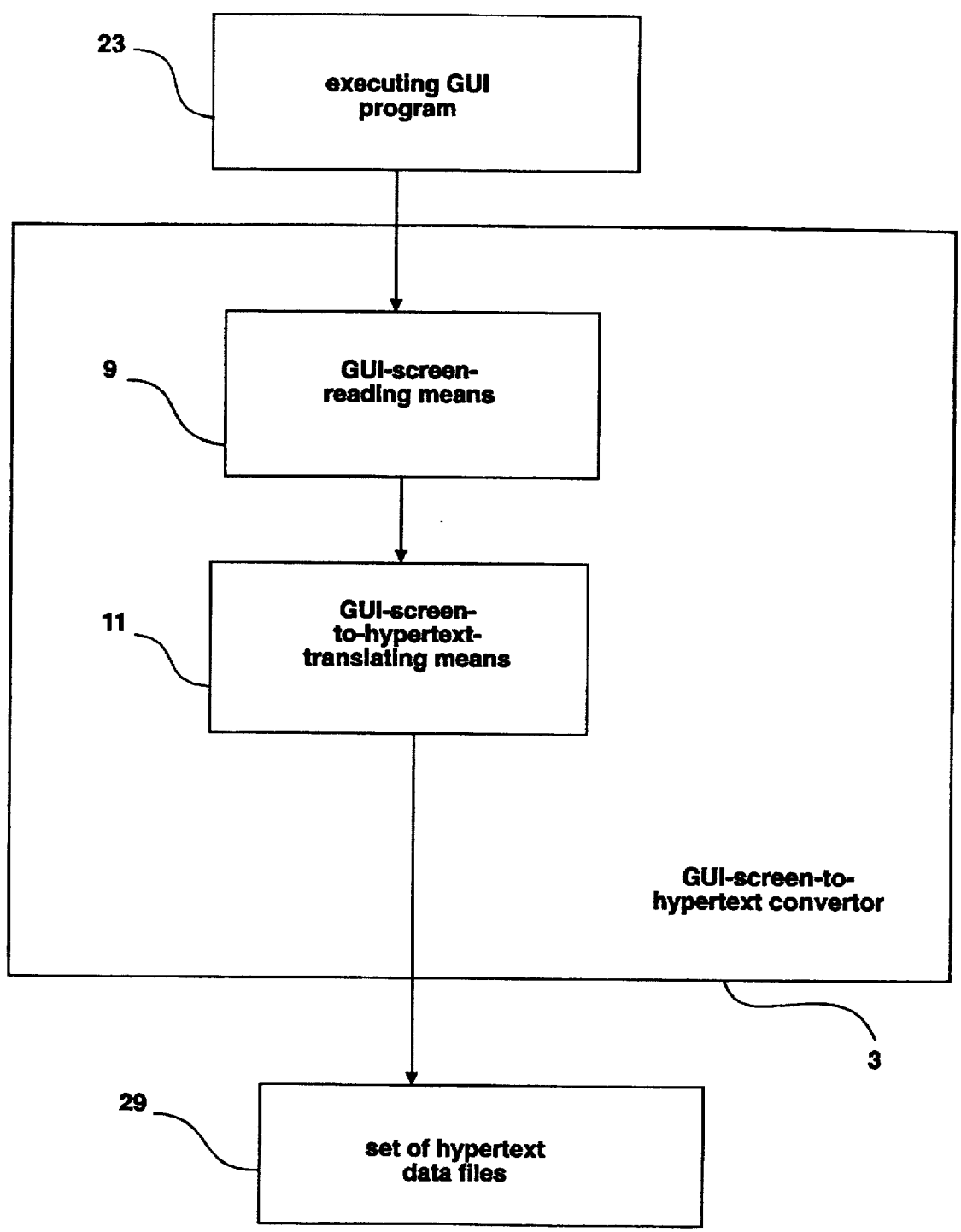
FIG. 5 is a break-out diagram of the GUI-screen-to-hypertext convertor, showing the GUI-screen-to-hypertext convertor independent from a remote control system.
Figure 6:
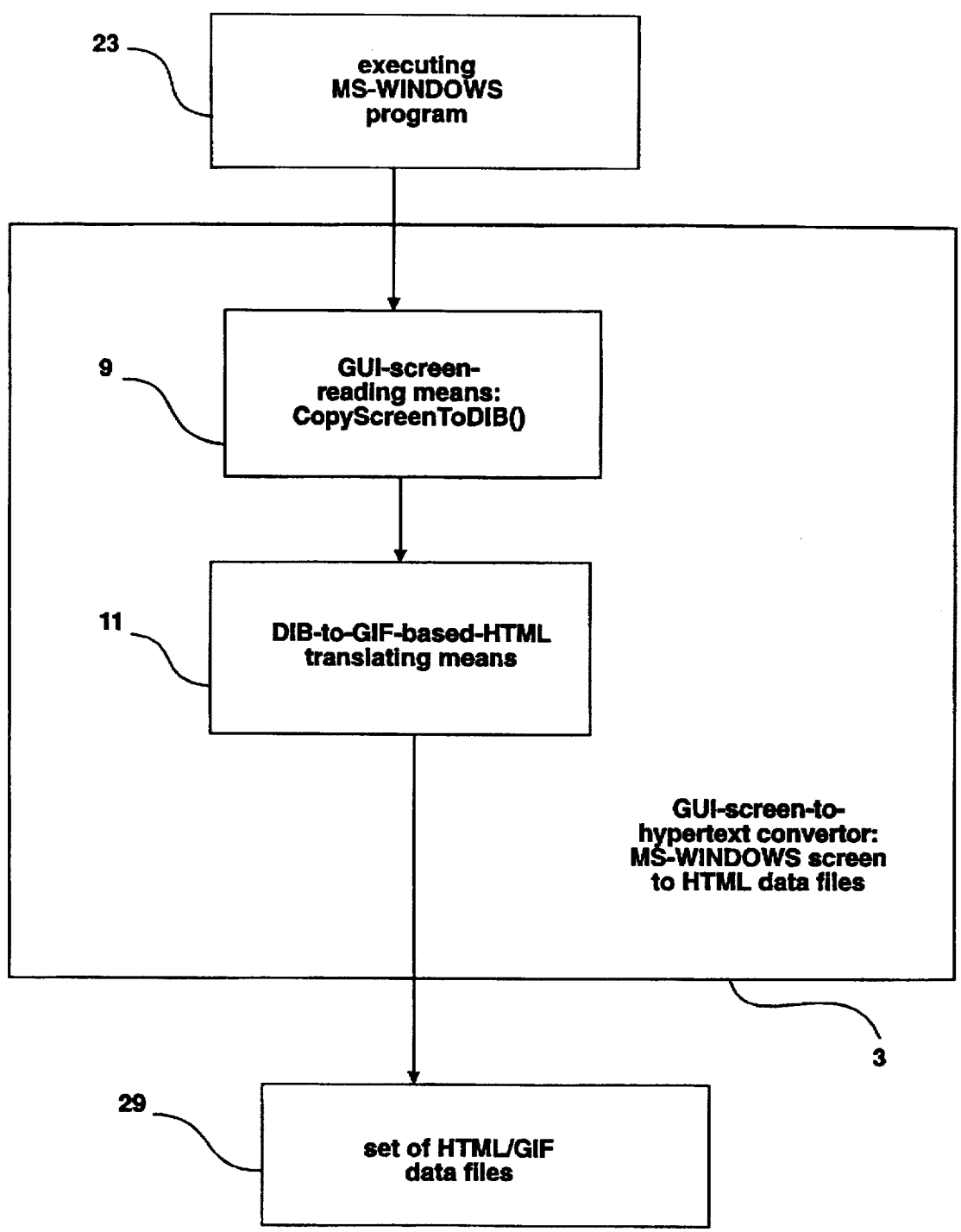
FIG. 6 is a variation of FIG. 5 illustrating the preferred embodiment of the present invention.

It is contemplated that the GUI-screen-to-hypertext convertor 3 is useful in applications other than a remote control system 1. FIG. 5 generally shows a block diagram of the GUI-screen-to-hypertext convertor 3 as an independent invention. FIG. 6 shows a block diagram of the GUI-screen-to-hypertext convertor 3 in the preferred embodiment where it converts the screen of a Microsoft Windows program into a set of HTML data files.

Figure 7:
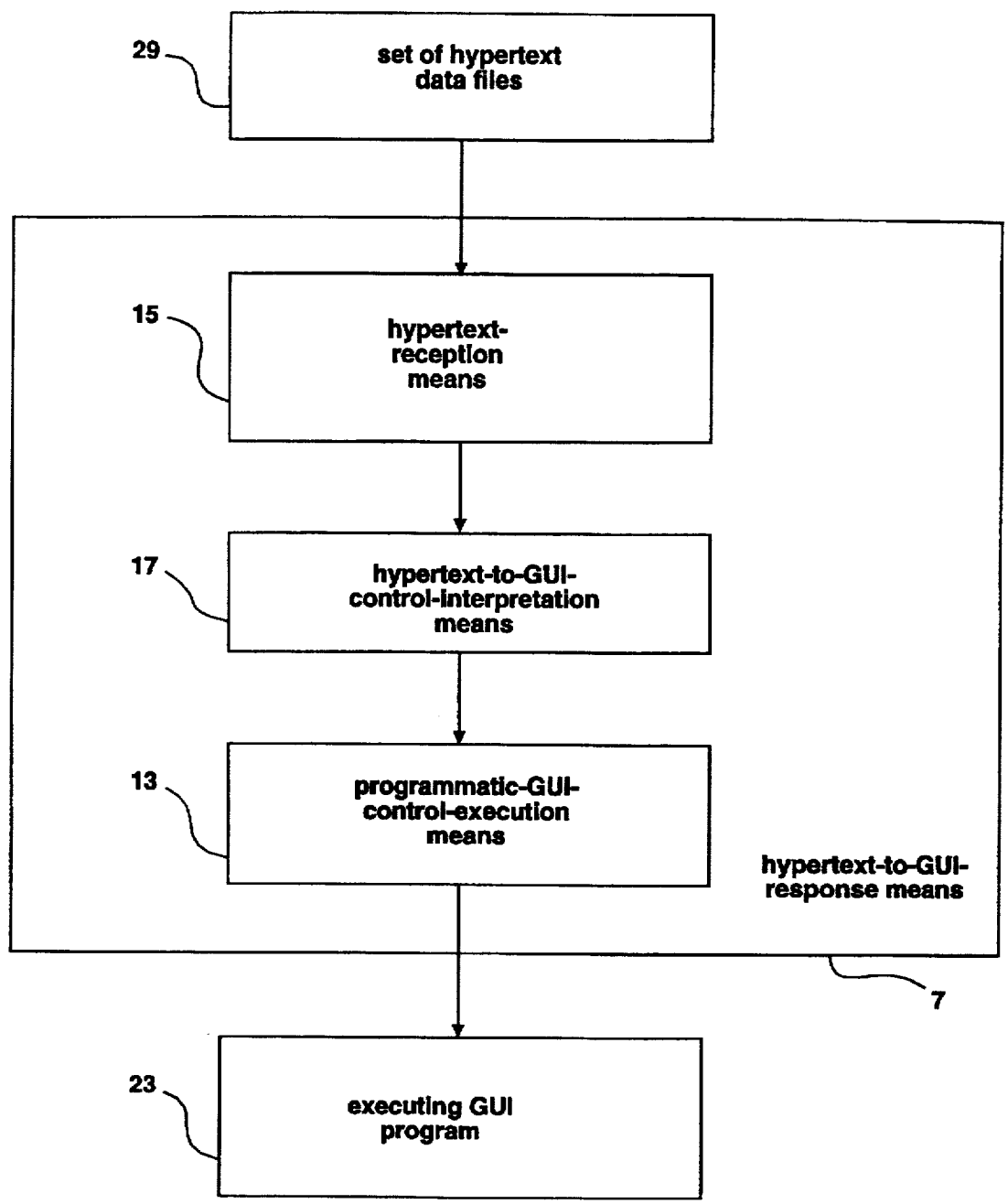
FIG. 7 is a break-out diagram of the hypertext-to-GUI-response means, showing the hypertext-to-GUI-response means independent from a remote control system.
Figure 8:
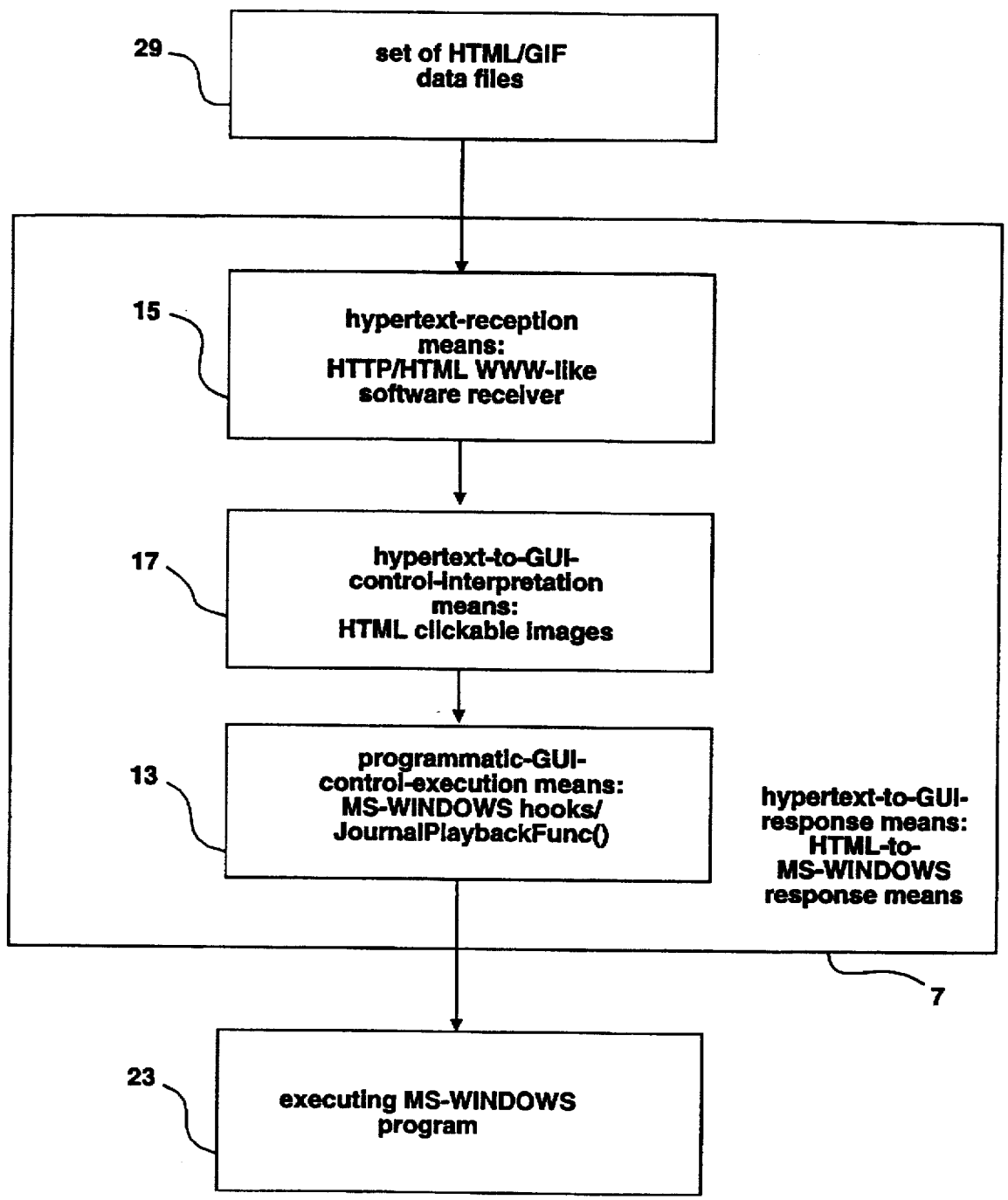
FIG. 8 is a variation of FIG. 7 illustrating the preferred embodiment of the present invention.

It is also contemplated that the hypertext-to-GUI-response means 7 is useful in applications other than a remote control system 1. FIG. 7 generally shows a block diagram of the hypertext-to-GUI-response means 7 as an independent invention. FIG. 8 shows a block diagram of the hypertext-to-GUI-response means 7 in the preferred embodiment where it is used to access a set of static HTML and GIF files 29 and interpret the files set 29 and execute the corresponding controls within a Microsoft Windows program 23.

The "building block" elements are all based on GUI and hypertext concepts. The first building block is the GUI-screen-reading means 9, which is a means to read the graphical user interface (GUI) screen of the first computer 19 into a data structure of a control program 21 executing on the first computer 19. In the preferred embodiment, this GUI screen reading means 9 is a software routine named CopyScreenToDIB(). The source code is available from the Microsoft Developer's Network [3]. The function uses the published Windows SDK API [4,5] to read the computer screen and store the resulting bitmap in a data structure Microsoft calls a DIB.

The second building block is the GUI-screen-to-hypertext-translating means 11, a means to translate the data structure representing the screen into hypertext language text. In the preferred embodiment, the hypertext language used is the Hypertext Markup Language (HTML) [6,7] used in the World-Wide-Web (WWW) service of the internet [9]. The GUI-screen-to-hypertext-translating means 11 used in the preferred embodiment in FIG. 6 is formed by converting the screen image in the DIB data structure into the GIF file format. The GIF file format is described in [1,2], and code describing how to convert bitmap data to a GIF file is described in [1]. A simple HTML data file, arbitrarily name REMOTE2.HTM in the preferred embodiment, as shown in FIG. 9, is an example in the preferred embodiment of a GUI screen that has been translated to HTML (The contents of the associated GIF file are not shown). The HTML file references a separate GIF file containing the screen image, previous built by the GUI-screen-reading means 9. The screen GIF file is referenced in an IMG SRC tag 33 of an HTML <a href> tag 35 with the ISMAP option 37 as shown in FIG. 9 according to definitions and rules of the HTML language [6,7]. When this HTML file is ultimately displayed by a browser 27 such as Netscape [8], an virtually exact screen image appears as a graphical image on the screen of the second computer 25. The result is the GUI screen of the executing GUI program 23 has effectively been translated into an HTML file with a corresponding GIF file 29.

The third building block is the hypertext-reception means 15, a means to receive hypertext data. In the preferred embodiment, this hypertext reception means 15 is a software routine built to receive HTML data via the HTTP protocol [9] as is widely and publicly used in prior-art WWW service programs[9,6,7,8].

The fourth building block is the hypertext-to-GUI-control-interpretation means 17, a means to interpret specific hypertext language as a reference to a specific GUI control. In the preferred embodiment as shown in FIG. 8, this HTML to GUI control interpretation means 17 is the "clickable image" feature of HTML[6,7]. In the file REMOTE2.HTM HTML file as shown in FIG. 9, the ISMAP option 37 of the IMG tag 33 tells the browser 27 that the image is a "clickable image". Because the screen appears as a clickable image, a browser 27 such as Netscape[8], following the HTTP protocol[6,7], allows the user to click on any part of the image. In accordance with the HTML protocol [6,7], when the user clicks on the screen images, the browser 27 records the screen coordinates the mouse was pointing to at click time, and produces an HTML hypertext query string to be sent to the first computer 19 of the form "http:clik0001?123, 456", where 123,456 will denote the actual screen coordinates of the click location {123,456}. This "clik" file reference, when received by the first computer 19, in the present invention is actually a pseudo file reference, meaning it does not represent an actual file. Instead, the pseudo file reference is interpreted as a mouse click to be executed on the first computer at the point on the screen corresponding to the coordinates specified in the HTML query string. The actual pseudo file reference names chosen are arbitrary and are governed by the coordinated naming convention 5, described below, and are needed so that each component of the system can interpret the file references in a meaningful and useful way.

The fifth building block is the programmatic-GUI-control-execution means 13, a means to execute a particular control function on the first computer 19 once it has been interpreted. That is, by convention, (notably the coordinated naming convention 5), when the user of browser program (such as Netscape [8]) on the second computer "clicked" on pixel {123,456}, the hypertext-reception means 15 as illustrated in FIG. 7 receives the "clik" pseudo file reference. The hypertext-to-GUI-control interpretation means 17 recognizes and interprets that the user actually "clicked", and instructs the programmatic-GUI-control-execution means 13 of the hypertext-to-GUI-response means 7 to actually "click" the GUI screen on the first computer at the location {123,456}. In the preferred embodiment, as shown in FIG. 8, the programmatic-GUI-control-execution means 13 is implemented using the Microsoft Windows Hooks technology, a part of the Microsoft Windows SDK API programming interface [3]. This technology is fully described in the article entitled "Microsoft Windows Hooks", available in the Microsoft Developer's Network (MDN)[3]. In particular, the WH_JOURNALPLAYBACK hook, generally used to playback record mouse movements and clicks, is used to playback a "synthetic" click at the required screen coordinates. Source code using this technique is also published by Microsoft as part of the Microsoft Developer's Network in a function called JournalPlaybackFunc() in a file called HOOKSDLL.C [3].

The sixth building block is a coordinated naming convention 5 used in the hypertext files produced and interpreted by the present invention. In the preferred embodiment, the naming convention is used in the HTML files shown in FIGS. 9–10 and is also in the internal logic of the GUI-screen-to-hypertext convertor 3 and the hypertext-to-GUI-response means 7. In the preferred embodiment of the present invention, the following naming conventions are used:

Naming convention #1: A file reference of the form REMO####.HTM 39 denotes a virtual file that represents the current image of the GUI screen of the first computer, and is generally sent in response to a "REFRESH" request by the user. See FIG. 9. In the file reference, the "####" in the file name is replaced by an integer of the form "0001" as the file is transmitted to the browser 27 on the second computer 25. This is necessary because browsers 27, when they receive a duplicate file name, thinking they are referencing an actual static file, often will simply repeat the previous image, not realizing the file has in effect changed (as the screen on the first computer 19 changes). By incrementing the integer, each file reference is different, causing the browser to correctly seek a new copy of the file from the first computer 19, which is the desired behavior to effect remote control.

Naming convention #2: A file reference of the form REMX####.HTM 41 denotes a file that presents the user with mode and other control options and allows the user to affect the semantics of future clicks by selecting certain commands. In particular, since most WWW browsers only allow single clicks, yet a user may need to click, double click, send text, drag and drop, and perform other sophisticated mouse and keyboard control operations, the mode page allows such operations to be requested and stored into HTML variables that will be attached to future <a href> HTML tags of HTML files produced by the present invention, thus allowing mouse clicks to be interpreted in a number of different ways.

Naming convention #3; A file reference of the form CLIK####.HTM 43 denotes a command to "click" on the GUI screen of the first computer.

Naming convention #4: The HTML variable MODE 45, as shown in FIG. 10, denotes the desired control behavior associated with subsequent mouse clicks. MODE=1 denotes a single click; MODE=2 denotes a double mouse click; MODE=3 denotes keyboard text contained in variable KEYTEXT; MODE=4 denotes the start location of a drag operation; MODE=5 denotes the end location of a drag operation.

Naming convention #5: Since HTTP is a "stateless" protocol, HTTP variables cannot be permanently stored as program variables on the first computer. Instead, the variables are collected and appended to appropriate URL's of each HTML file produced by the present invention. When a URL is transmitted to the first computer, the control program decodes the HTTP variables.

The six building blocks just described form the basis of the present invention as illustrated in FIG. 2. The building blocks of the present invention are combined into a server control program 21 and installed on the first computer as shown in FIG. 3 to produce a remote control system 1. As FIG. 3 illustrates, the remote control system 1 need only be installed on the first computer 19. One or more second computers 25 running a standard, off-the-shelf hypertext browser program 27, can effectuate remote control using the standard, widely installed networking protocols, including those used in the internet [9].

FIG. 4 illustrates how the preferred embodiment of the remote control system is installed and utilized. In the preferred embodiment, the system runs over the internet [9]. The first controlled computer 19 is a Microsoft Windows (such as Windows NT) machine. The executing GUI program 23 can be any MS-Windows program including the program manager, and is generally whatever program is in the foreground of the first computer 19. The remote control system 1 is realized as a server control program 21 installed on the first computer 19. In the preferred embodiment, the GUI-screen-to-hypertext convertor is a MS-WINDOWS to HTML convertor, a software routine that combines screen reading routines from the Microsoft Developer's Network [3] with GIF encoding routines taught by [1].

In the preferred embodiment as illustrated in FIG. 4, the hypertext-to-GUI-response means 7 is a HTML to MS-WINDOWS response means. The clickable image features of HTML [6,7] are combined with Microsoft hooks [3] in a novel way to effectuate remote control.

Of course the invention is not limited to this preferred embodiment. It is contemplated that the first "controlled" computer 19 can be any GUI based computing environment, including, but not limited to, all version of Microsoft Windows and its successors including Windows 95, Windows NT, as well as other windowed platforms,including XWindows, Unix machines, the Apple Macintosh—any computer that can function as a server on the internet.

Although the preferred embodiment is on the internet, the present invention contemplates wider usage, including "private" local systems, as well as other networking scheme that may form the so-called "information highway" in the future. The preferred embodiment utilizes the World-Wide-Web (WWW) and HTML as a hypertext language, but the present invention is easily adaptable to any kind of hypertext transport system and any kind of hypertext language, such as JAVA, an extension of HTML promoted by Sun. The preferred embodiment contemplates usage with a hypertext browser such as Netscape, but of course any browser that can communicated in the supported hypertext language will work. In particular, it is contemplated that the main use of the present invention is for computer environments that are new and foreign from the operating environment of the first computer, thus as new computing environments are developed, it is anticipated that the principles of the present invention are easily and naturally extended to new variations of computer systems and computer networking technology.

OPERATION OF THE PREFERRED EMBODIMENT OF THE REMOTE CONTROL SYSTEM

In the preferred embodiment, as shown in FIG. 4, the GUI-screen-to-hypertext convertor 3, the hypertext-to-GUIresponse means 7 and the coordinated naming convention 5 are combined into a single server control program 21 that runs on the first computer 19. The server control program 21 employs the HTTP protocol [9] and functions as a WWW "web" server[9] on the first computer 19. The WWW server thus configured has an established internet address. A certain filename, as established by the coordinated naming convention 5, is used to initiate a remote control session: REM2.HTM. The web server program is executed and enters a "listen model" state as described in the WWW server specification[9], and awaits a WWW client request.

The second computer 25 is connected to the first computer over the internet 31, a well known TCP/IP networking means. A standard WWW "Web" browser 27 such as Netscape [8] is initiated on a second computer. To operate the remote control system 1, a user on the second computer 25 specifies the "starter URL" as specified by the coordinated naming convention 5. URLs are defined by the WWW specification and include a named address of a target computer and a filename associated with the target computer. The URL must be that URL that identifies the starting filename on the first computer and must contain the proper internet address of the WWW server program on the target first computer. For example, the starter URL might be: http://www.webnet.computer1.com\rem2.htm. In this example, the internet address of the WWW server program is "www.webnet.computer1.com" and the starting filename is "rem2.htm". Well-known internet routing protocols will route the starter URL from the second computer to the first computer.

The server control program 21 on the first computer 19 recognizes the URL from the second computer and accepts the connection as defined by HTTP and WWW protocol [9]. In response to the starter URL, the server program 21 builds a new file, a GIF image file containing the screen image of the GUI on the first computer, and returns the data of REMOTE.HTM. REMOTE.HTM contains appropriate HTML references to the GIF file so that the GIF file will be displayed as a clickable image. In the preferred embodiment, the GIF file thus built is a 256 color image of the GUI screen of the first computer 19.

The browser 27 on the second computer 25 will decode the HTML document file, and locate the references to the GIF file, request and retrieve the GIF file containing the screen image in a separate HTTP request, and display the GIF image on the screen of the second computer 25, as an HTML "clickable" image. The user in this embodiment will see a screen virtually identical to the GUI screen on the first computer. The user may then click on a menu, button, or other Windows control image. The WWW browser, in accordance with HTML/HTTP protocol [9,6,7], will determine the coordinates pointed to be the mouse. The coordinates will be sent to the URL associated with the region in the map file, which will contain the address of the first computer. In addition to the coordinates, the HTML mode variables defined by the coordinated naming convention 5 will also be transmitted as the result of a click.

The internet routing protocols, in conjunction with the HTML protocol and the HTTP protocol, will deliver the URL to the WWW server program 21 on the first computer 19. The server control program 21 on the first computer 19 converts the HTML URL selection to GUI control commands using the hypertext-to-GUI-response means 7, and interpret the associated filename as a selection for the corresponding control according to the coordinated naming convention 5, and programmatically select the control or perform other action as request by the MODE and KEY-TEXT variables using the programmatic-GUI-control-execution means 13 of the hypertext-to-GUI-response means 7. The GUI interface on the first computer 19 will act as if the control was selected locally, and typically respond by changing the screen to another visual state the underlying program being remotely controlled. Moments later, a user at the second computer 25 will typically select the "REFRESH" hypertext link which sends a reference of REMOTE.HTM of FIG. 10 to the first computer, repeating the behavior just described. The user can continue to push buttons, select menus, enter text, and perform other control functions from the second computer 25. The response on the browser is not necessarily in real time; typically a few seconds pass between clicks and response files. This sequence will continue until user of the WWW browser program 27 on the second computer 25 terminates.

Other uses, variations, and modifications will be apparent to persons skilled in the art. All such uses, variations, and modifications are intended to fall within the spirit and scope of the appended claims.

It is also contemplated that the GUI-screen-to-hypertext convertor 3 is useful in applications apart from the remote control system 1 as shown in FIG. 5 and FIG. 6. Likewise it is contemplated that the hypertext-to-GUI-response means 7 is useful in applications apart from the remote control system 1 as shown in FIG. 7 and FIG. 8.

I claim:

1. A GUI-screen-to-hypertext converter for converting a GUI screen to hypertext comprising:

a GUI-screen-reading means for retrieving and converting a GUI screen into screen image data, a GUI-screen-to-hypertext-translating means for converting screen image data into hypertext, the GUI-screen-reading means is software coupled to the GUI-screen-to-hypertext-translating means, allowing screen image data to pass from the GUI-screen-reading means to the GUI-screen-to-hypertext-translating means whereby the GUI screen is retrieved and converted to hypertext.

2. A hypertext-to-GUI-response means for converting a hypertext data request to a GUI control command comprising:

a hypertext-reception means for receiving the hypertext data request, a hypertext-to-GUI-control-interpretation means for interpreting hypertext data requests as the GUI control command, and a programmatic-GUI-control-execution means for executing the GUI control command, the hypertext-reception means is software coupled to the hypertext-to-GUI-control-interpretation means, the hypertext-to-GUI-control-interpretation means is software coupled to the programmatic-GUI-control-execution means, whereby the hypertext-reception means receives the hypertext data request and presents the hypertext data request to the hypertext-to-GUI-control-interpretation means, the hypertext-to-GUI-control-interpretation means interprets the hypertext data request as the GUI control commands and executes the interpreted GUI control commands using the programmatic-GUI-control-execution means.

3. A remote control system for controlling a GUI program on a first computer with a hypertext browser program on one or more second computers comprising:

a GUI-screen-to-hypertext converter for converting a GUI screen to hypertext further comprising:
  a GUI-screen-reading means for retrieving and converting a GUI screen into screen image data,
  a GUI-screen-to-hypertext-translating means for converting screen image data into hypertext,
  the GUI-screen-reading means is software coupled to the GUI-screen-to-hypertext-translating means, allowing screen image data to pass from the GUIscreen-reading means to the GUI-screen-to-hypertext-translating means
  whereby the GUI screen is retrieved and converted to hypertext,
a hypertext-to-GUI-response means for converting a hypertext data request to a GUI control command further comprising:
  a hypertext-reception means for receiving the hypertext data request,
  a hypertext-to-GUI-control-interpretation means for interpreting hypertext data requests as the GUI control command, and
  a programmatic-GUI-control-execution means for executing the GUI control command,
  the hypertext-reception means is software coupled to the hypertext-to-GUI-control-interpretation means,
  the hypertext-to-GUI-control-interpretation means is software coupled to the programmatic-GUI-control-execution means,
  whereby the hypertext-reception means receives the hypertext data request and presents the hypertext data request to the hypertext-to-GUI-control-interpretation means, the hypertext-to-GUI control-interpretation means interprets the hypertext data request as the GUI control commands and executes the interpreted GUI control commands using the programmatic-GUI-control-execution means, and
a coordinated naming convention,
whereby program on said first computer is remotely controlled by hypertext browser program of said second computer, and information contained on GUI screen of said first computer is reflected on the screen of the hypertext viewer on the second computer.

4. The remote control system of claim 3 wherein said GUI-screen-reading means is the Microsoft Windows CopyScreentoDib() function.

5. The remote control system of claim 3 wherein said GUI-screen-to-hypertext-translating means further includes a software means to convert screen image to a set of HTML and GIF files.

6. The remote control system of claim 3 wherein said hypertext-reception means further includes a software means to receive HTML data via the HTTP protocol.

7. The remote control system of claim 3 wherein said hypertext-to-GUI-control-interpretation means is HTML further including clickable images of HTML.

8. The remote control system of claim 3 wherein said programmatic GUI-control-execution means is Microsoft Windows hooks routines including JournalPlaybackFunc().

9. The remote control system of claim 3 wherein said GUI-screen-reading means is the Microsoft Windows CopyScreentoDib() function, said GUI-screen-to-hypertext-translating means further includes a software means to convert screen image to a set of HTML and GIF files, said hypertext-reception means further includes a software means to receive HTML data via the HTTP protocol, said hypertext-to-GUI-control-interpretation means is HTML further including clickable images of HTML, and said programmatic GUI-control-execution means is Microsoft Windows hooks routines including JournalPlaybackFunc().

10. A GUI-screen-to-hypertext converter, comprising:
  a GUI-screen reader;
  a GUI-screen-to-hypertext translator;
  the GUI-screen-reader is software coupled to the GUI-screen-to-hypertext-translator, allowing screen image data to pass from the GUI-screen-reader to the GUI-screen-to-hypertext-translator; and
  whereby the GUI screen is retrieved and converted to hypertext.

11. A hypertext-to-GUI-responder, comprising:
  a hypertext-receiver;
  a hypertext-to-GUI-control-interpreter;
  a programmatic-GUI-control-executor;
  the hypertext-receiver is software coupled to the hypertext-to-GUI-control-interpreter;
  the hypertext-to-GUI-control-interpreter is software coupled to the programmatic-GUI-control-executor; and
  whereby the hypertext-receiver receives the hypertext data request and presents the hypertext data request to the hypertext-to-GUI-control-interpreter, the hypertext-to-GUI-control-interpreter interprets the hypertext data request as the GUI control commands and executes the interpreted GUI control commands using the programmatic-GUI-control-executor.

12. A remote control system having a GUI program on a first computer and a hypertext browser program on at least one second computer, comprising:
  a GUI-screen to hypertext converter comprising
    a GUI-screen-reader,
    a GUI-screen-to-hypertext-translator,
    the GUI-screen-reader is software coupled to the GUI-screen-to-hypertext-translator, allowing screen image data to pass from the GUI-screen-reader to the GUI-screen-to-hypertext-translator, and
    whereby the GUI screen is retrieved and converted to hypertext;
  a hypertext-to-GUI-responder comprising
    a hypertext-receiver,
    a hypertext-to-GUI-control-interpreter,
    a programmatic-GUI-control-executor, the hypertext-receiver is software coupled to the hypertext-to-GUI-control-interpreter,
    the hypertext-to-GUI-control-interpreter is software coupled to the programmatic-GUI-control-executor, and
    whereby the hypertext-receiver receives the hypertext data request and presents the hypertext data request to the hypertext-to-GUI control-interpreter, the hypertext-to-GUI-control-interpreter interprets the hypertext data request as the GUI control commands and executes the interpreted GUI control commands using the programmatic-GUI-control-executor;
  a coordinated naming convention; and
  whereby program on said first computer is remotely controlled by hypertext browser program of said second computer, and information contained on GUI screen of said first computer is reflected on the screen of the hypertext viewer on the second computer.

13. The remote control system of claim 12 wherein said GUI-screen-reader is the Microsoft Windows CopyScreentoDib() function.

14. The remote control system of claim 12 wherein said GUI-screen-to-hypertext-translator converts said screen image data to a set of HTML and GIF files.

15. The remote control system of claim 12 wherein said hypertext-receiver receives HTML data via the HTTP protocol.

16. The remote control system of claim 12 wherein said hypertext-to-GUI-control-interpreter is HTML further including clickable images of HTML.

17. The remote control system of claim 12 wherein said programmatic-GUI-control-executor is Microsoft Windows hooks routines including JournalPlaybackFunc().

18. The remote control system of claim 12, wherein:

said GUI-screen-reader is the Microsoft Windows CopyScreentoDibo function;

said GUI-screen-to-hypertext-translator converts said screen image data to a set of HTML and GIF files;

said hypertext-receiver receives HTML data via the HTTP protocol;

said hypertext-to-GUI-control-interpreter is HTML further including clickable images of HTML; and said programmatic-GUI-control-executor is Microsoft Windows hooks routines including JournalPlaybackFunc().

* * * * *

UNITED STATES PATENT AND TRADEMARK OFFICE
CERTIFICATE OF CORRECTION

PATENT NO. : 5,801,689
DATED : September 1, 1998
INVENTOR(S) : Robert A. Huntsman It is certified that error appears in the above-identified patent and that said Letters Patent is hereby corrected as shown below:

*On the cover page*
At Attorney, Agent, or Firm-, delete "Steven R. Ormiston" and insert
--Robert A. Huntsman--.

At column 1, line 4, delete "ion" and insert --invention--.
At column 1, line 7, after "a" delete "-".
At column 1, line 38, delete "to" and insert --for--.
At column 1, line 39, after "with" insert --a--.
At column 1, line 42, delete "is" and insert --are--.
At column 1, line 63, delete "to".
At column 1, line 65, delete "situation" and insert --situations--.
At column 2, line 5, delete "GUIS" and insert --GUIs--.
At column 6, line 11, delete "previous" and insert --previously--.
At column 6, line 16, delete "an" and insert --a--.
At column 8, line 45, delete "scheme" and insert --schemes--.
At column 8, line 54," communicated" and insert --communicate--.
At column 9, line 52, delete "be" and insert --by--.
At column 13, line 12, delete "ScreentoDibo" and insert --ScreentoDib0--.

Signed and Sealed this

Ninth Day of March, 1999

*Attest:*

Q. TODD DICKINSON

*Attesting Officer*     Acting Commissioner of Patents and Trademarks